United States Patent Office 3,267,137
Patented August 16, 1966

3,267,137
PROCESS FOR THE MANUFACTURE OF POLYCARBODIIMIDES
Peter Fischer, Cologne-Stammheim, Germany, assignor to Farbenfabriken Bayer Aktiengesellschaft, Leverkusen, Germany, a German corporation
No Drawing. Filed May 31, 1961, Ser. No. 113,652
Claims priority, application Germany, June 7, 1960, F 31,398
7 Claims. (Cl. 260—551)

This invention is directed to a new method of manufacturing polycarbodiimides, that is compounds having a plurality of —N=C=N— groups.

Carbodiimides such as diphenylcarbodiimide are well known. The art is summarized in Chemical Reviews, 53, pp. 145–166 (1953) and in Chemistry of Carbon Compounds, vol. III-A, Elsevier Publishing Company, 1954, p. 205.

It is an object of this invention to provide for the manufacture of a new kind of carbodiimides having a plurality of carbodiimide groups and which can additionally have isocyanate groups.

It is known from German Patent No. 1,012,601 to prepare addition compounds from carbodiimides and isocyanates, which compounds may have the following formula:

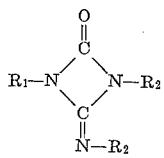

It is known that these addition products can be split back easily into their starting products, and in the case of the aforesaid formula, the monoisocyanates $R_1$—NCO and the carbodiimide $R_2$—NCN—$R_2$ are again obtained. Consequently, as the addition product splits readily, an equilibrium must exist between the two starting materials and the addition compound.

The present invention is based on the discovery that an equilibrium exists not only between the addition compound and the two starting materials, but also with the isocyanate $R_2$—NCO and the carbodiimide $R_2$—NCN—$R_2$ It was found that by reacting polyvalent isocyanates with monocarbodiimides, a monoisocyanate is found in the equilibrium and can easily be removed as it is the most readily volatile component, so that a polycarbodiimide is finally obtained due to constantly displacing the equilibrium.

The present invention is thus concerned with a process for the production of polycarbodiimides, which comprises reacting a polyisocyanate of formula $R_1(NCO)_x$ with a monocarbodiimide of formula $R_2$—NCN'—$R_2$ and selectively removing a monoisocyanate $R_2$—NCO formed in this reaction from the reaction mixture.

In the above formulae $x$ represents an integer of at least 2 and preferably up to 4, $R_1$ represents an organic radical $x$ which can be an aliphatic, aromatic, cycloaliphatic or heterocyclic hydrocarbon residue which may be substituted in any desired manner, for instance, by chloro, nitro, alkoxy. $R_2$ represents a monovalent organic radical of the same type as the above polyvalent organic radical.

Polyvalent isocyanates having the formula $R_1(NCO)_x$ suitable for the process of the present invention include aliphatic, cycloaliphatic and aromatic diisocyanates and also triisocyanates and higher valent isocyanates which may also be of heterocyclic nature. The following may be listed as examples: tetramethylene diisocyanate, hexamethylene diisocyanate, cyclohexylene-1,3-diisocyanate, cyclohexylene-1,4-diisocyanate, 1-methyl-cyclohexylene-2,4-diisocyanate, dicyclohexylmethane-4,4'-diisocyanate, hexahydrodiphenylmethane-4,4'-diisocyanate, 1,3-phenylene diisocyanate, 1,4-phenylene diisocyanate, 2,4-toluylene diisocyanate, 2,6-toluylene diisocyanate, diphenylmethane-4,4'-diisocyanate, 1,5-naphthylene diisocyanate, 1-nitrobenzene-2,4-diisocyanate, 1-chlorobenzene-2,4 - diisocyanate, 1,3-dichlorobenzene-2,4-diisocyanate, 1-methyl-4-methoxybenzene-2,4-diisocyanate, 1,4-dioxybenzene-2,4-diisocyanate, azobenzene-4,4'-diisocyanate, diphenylether-4,4'-diisocyanate, diphenylsulfon - 4,4' - diisocyanate, 1-methylbenzene-2,4,6-triisocyanate. Furthermore may be mentioned the reaction product of one mol trimethylolpropane or one mol pentaerythrite with three mols and four mols respectively of toluylene diisocyanate as well as the polyisocyanates of the diphenylmethane series described in French Patent 1,264,248. Also to be mentioned are trimerisation products containing free isocyanate groups and the polymers of hexamethylene diisocyanate obtained in the presence of oxygen.

Monocarbodiimides of the formula  suitable in the present process include dimethylcarbodiimide, diethylcarbodiimide, methylpropylcarbodiimide, methyl tertiary butylcarbodiimide, diisopropylcarbodiimide, dicyclohexylcarbodiimide, diphenylcarbodiimide, tertiary butylphenylcarbodiimide, bis-p-chlorophenyl-carbodiimide, bis-p-nitrophenyl-carbodiimide, bis-(4-tolyl)-carbodiimide.

The components can be reacted in various ways, care being taken that the monoisocyanate which is formed is selectively removed from the reaction mixture. In principle, the reaction can also take place at room temperature, but the most favourable temperature range as regards consumption of time and energy is between 80 and 230° C. At even higher temperatures, cross-linking reactions due to carbodiimide-polymerisation can occur.

Depending on its nature, the monoisocyanate can be removed from the reaction mixture by simply applying a suitable vacuum, by fractionated distillation or also for example by extraction.

Either the polyvalent isocyanate or the monocarbodiimide can be placed initially in the reaction vessel. The second component is then introduced, the temperature and pressure in the reaction vessel and the running-in speed being so chosen that the monoisocyanate can distill off at the rate at which it forms. According to another working method, a polyvalent isocyanate and a monocarbodiimide are introduced into a reaction vessel, placed under vacuum and heated at the rate at which the liberated monoisocyanate distills off uniformly.

If desired the reaction can also be performed in solution. Suitable inert solvents are esters, ethers, ketones, hydrocarbons and halogenated hydrocarbons such as ethyl acetate, acetone, toluene or chlorobenzene.

In the reaction, carbodiimide groups and isocyanate groups of the polyvalent isocyanate are consumed in equivalent quantities, regardless of whether the polycarbodiimides resulting from the reaction comprise two or more carbodiimide groups. It is advisable to use the monocarbodiimide in excess. Any unreacted monocarbodiimide can, if necessary, be substantially separated out by vacuum distillation from the polycarbodiimide formed in the reaction.

If the polyisocyanates are used in excess polycarbodiimides which contain free isocyanate groups will result.

Since carbodiimide groups in connection with a number of aromatic polyvalent isocyanates initiate a spontaneous condensation of the isocyanates splitting off carbon dioxide and leading to the formation of a polycarbodiimide having free NCO groups, this reaction can additionally be utilised for the formation of polycarbodiimides. The monocarbodiimide present in the reaction mixture reacts simultaneously with the monomeric polyvalent isocyanate which is present or also with the polycarbodiimide containing free isocyanate groups and formed by spontaneous condensation. With such polyvalent isocyanates, which do not already show a tendency to spontaneous condensation in the presence of carbodiimide groups, this spontaneous condensation can be initiated by adding catalyst containing phosphine oxide groups, such as tributyl or triphenylphosphine oxide. In this way, it is also possible with a phosphine oxide catalyst first of all to carry out a spontaneous condensation of a polyvalent isocyanate, (with carbon dioxide being split off), to form a polycarbodiimide containing free isocyanate groups and then, after adding a monocarbodiimide, to carry out the process according to the invention with the polyvalent isocyanate thereby obtained. In such a case, a substance having an even larger number of carbodiimide groups is formed.

The products obtained by the process of the invention are usually oily to resinous substances, some of which are soluble in organic solvents.

The presence in the molecule of several carbodiimide groups capable of forming addition reactions makes it possible for cross-linking reactions to be carried out with the polycarbodiimide and in this way to prepare lacquer resins and plastics. For instance high molecular weight compounds having free carboxyl groups such as polyesters or polyacrylic acid can be cross-linked by adding polycarbodiimides to give a material which is highly useful as casting resin or sealing compound.

*Example 1*

On heating 313 parts by weight of hexamethylene-1,6-diisocyanate and 384 parts by weight of dicyclohexylcarbodiimide, 184 parts by weight of pure cyclohexylisocyanate distill off within 5 hours under a vacuum of 0.2 mm. Hg, with a sump temperature of 90° C., the cyclohexylisocyanate being collected in a receiver cooled with brine. After adding another 200 parts by weight of dicyclohexylcarbodiimide, the heat treatment is continued as the temperature is gradually raised at 210° C. The distilate occurring within 6 hours contains 232 parts by weight of cyclohexylisocyanate and 99 parts by weight of unchanged dicyclohexyl carbodiimide. The sump product contains 70.6% C., 9.65% H, 0.8% O and 19.95% N. Determination of the molecular weight, carried out by the cryoscopic method in benzene, gives a value of 1100. The infra-red spectrum shows a very vigorously developed carbodiimide band in the vicinity of 4.7$\mu$. A weaker band at 5.93$\mu$ is probably to be attributed to a polymerisation product formed from the carbodiimides. The polycarbodiimide is viscous at room temperature.

*Example 2*

If 174 parts by weight of toluylene-2,4-diisocyanate are heated under a vacuum of 100 mm. Hg and if 309 parts by weight of dicyclohexylcarbodiimide are added within 1 hour after reaching a temperature of 150° C., cyclohexylisocyanate escapes. In a vacuum slowly increasing to 8 mm. Hg and with a temperature gradually raised to 205° C., 153 parts by weight of unreacted dicyclohexylcarbodiimide are recovered. 203 parts by weight of a polycarbodiimide solidifying in resinous manner at room temperature are left in the sump, this polycarbodiimide, by elementary analysis, containing 74.6% C, 7.2% H, 0.5% O and 18.3% N. The average molecular weight is 950.

The 42 parts by weight of substance missing from the balance of quantities consists of carbon dioxide, which originates from the decomposition of the toluylene diisocyanate.

*Example 3*

Using the procedure indicated in Example 2, 135 parts by weight of cyclohexylisocyanate, 295 parts by weight of unreacted dicyclohexylcarbodiimide and 544 parts by weight of a light yellow resin with the following composition: 79.8% C, 6.8% H, 0.5% O and 1.3% N, are obtained from 500 parts by weight of 4,4'-diisocyanato diphenyl methane and 618 parts by weight of dicyclohexylcarbodiimide. The average molecular weight is 1200.

*Example 4*

From a basic mixture consisting of 2 parts by weight of 2,4'-diamino diphenyl methane,
85 parts by weight of 4,4'-diamino diphenyl methane,
12 parts by weight of 2,4-bis(4-aminobenzyl)-aniline, and
3 parts by weight of diphenylmethane bases with a function higher than 3, and using the process described in French Patent 1,264,248, polyisocyanate mixture with 28.9% of free isocyanate groups and of equivalent weight 42 is produced, the mixture containing carbodiimide-isocyanate adducts.

1100 parts by weight of this polyisocyanate mixture are heated together with 2500 parts by weight of dicyclohexylcarbodiimide under an oil pump vacuum and within 8 hours, to 170° C. In this case, first of all carbon dioxide is split off, and then 210 parts by weight of cyclohexylisocyanate and 1462 parts by weight of dicyclohexylcarbodiimide distill off. There are left 1750 parts by weight of a blackish brown soft resin of average molecular weight 700, which contains carbodiimide groups which can be detected by spectroscopy. Analysis: 78.6% C, 7.8% H, 0.4% O and 13.3% N.

*Example 5*

700 parts by weight of toluylenediisocyanate (an isomer mixture of 2,4- and 2,6-toluylenediisocyanates such as in a 65:35 ratio) and 3.5 parts by weight of tributylphosphine oxide are brought to a temperature of 140° C., whereupon carbon dioxide is split off. The content of free isocyanate groups falls within 2 hours from 48% to 39.5%. The polyisocyanate mixture containing carbodiimide groups is cooled to room temperature and added to 2500 parts by weight of dicyclohexylcarbodiimide. The mixture is placed under reduced pressure, during which more carbon dioxide is observed to split off, and is then heated to 150° C. Within 6 hours and under a vacuum of 0.3 mm. Hg 1820 parts by weight of dicyclohexylcarbodiimide containing a little cyclohexylisocyanate distill off into a receiver. The remaining 1130 parts by weight of polycarbodiimide solidify at room temperature into a light brown resin. The polycarbodiimide is soluble in toluene. Analysis: 75.2% C, 8.0% H, 0.3% O and 16.0% N. Molecular weight approximately 1100.

*Example 6*

700 parts by weight of hexamethylene-1,6-diisocyanate are treated for 4 hours at a temperature of 150° C. and for another 3 hours at a temperature of 120° C. with gaseous oxygen, using 50 parts by weight per hour. Carbon dioxide is split off. The product, which is thickly liquid in the cold state, contains 28% of free isocyanate groups. Analysis: 56.8% C, 7.4% H, 19.4% O, 15.8% N.

If 200 parts by weight of this polymerised isocyanate are heated within 4 hours to 160° C. with 600 parts by weight of dicyclohexylcarbodiimide under an oil pump vacuum, 171 parts by weight of cyclohexylisocyanate distill off, that is to say, approximately the quantity to be expected from the isocyanate content of the polyisocyanate, and also 309 parts by weight of dicyclohexylcarbodiimide. 310 parts by weight of a dark brown polycarbodiimide which is viscous at room temperature are left in the sump. Analysis: 69.2% C, 9.7% H, 4.3% O and 17.0% N.

*Example 7*

From a mixture of 125 parts by weight of hexamethylene-1,6-diisocyanate and 300 parts by weight of diethylcarbodiimide, 107 parts by weight of ethylisocyanate (i.e. the quantity to be theoretically expected), are distilled off within 4 hours in a column under normal pressure. The isocyanate fraction is followed by unreacted diethylcarbodiimide, of which 129 parts by weight are recovered. A third fraction, which is removed under a vacuum of 1 mm. Hg and with a sump temperature of 160° C., contains a carbodiimide of high boiling point. The sump product is light yellow and is still readily mobile at room temperature. Average molecular weight 343; elementary analysis: 65.3% C, 10.0% H, 0.8% O, 24.5% N.

*Example 8*

672 parts by weight of hexamethylene-1,6-diisocyanate and 3200 parts by weight of freshly distilled diphenylcarbodiimide are heated under a vacuum of 0.5 mm. Hg. From 105° C., phenylisocyanate is split off, and 812 parts by weight thereof are recovered, this being collected together with unreacted diphenylcarbodiimide in a receiver. 630 parts by weight of polycarbodiimide are obtained, this being a light-coloured soft resin with an average molecular weight of 700. By elementary analysis of the polycarbodiimide, a content of 77.5% C, 6.25% H, 0.3% O and 16.8% N was determined.

*Example 9*

From a mixture of 700 parts by weight of toluylenediisocyanate (2,4- and 2,6-isomers, such as a 65:35 ratio) and 3500 parts by weight of diphenylcarbodiimide, 2800 parts by weight of crude distillate are recovered within 4 hours under an oil pump vacuum at a temperature rising from 120 to 195° C. The distillate is split up by fractional distillation into 950 parts by weight of phenylisocyanate and 1020 parts by weight of diphenylcarbodiimide. The 1020 parts by weight of polycarbodiimide with an average molecular weight of 650 originating from the reaction contain 77.6% C, 5.0% H, 0.3% O and 17.2% N. The polycarbodiimide is solid at room temperature.

*Example 10*

*Preparation of the starting material.*—0.1 part by weight of N-methyl-diethanolamine and 0.4 part by weight of methanol are added to 100 parts by weight of toluylene-2,4-diisocyanate, which is then heated to 175° C., some of the isocyanate groups present in the reaction mixture trimerising into isocyanurate groups. The NCO content falls within 1 hour from 48.1% to 36.6% NCO. The reaction is stopped by adding 0.1 part by weight of benzyl chloride.

This polyisocyanate containing isocyanurate groups is cooled to 20° C., whereafter 350 parts by weight of dicyclohexylcarbodiimide are added thereto and heated in a vacuum of 0.2 mm. Hg so that the temperature slowly rises within 6 hours to 120° C. Another 1½ hours are required for the distillation of 200 parts by weight of dicyclohexylcarbodiimide containing isocyanate. 241 parts by weight of a light brown resin which is solid at room temperature are left behind, this resin having the following composition: 73.5% C, 8.6% H, 2.3% O and 17.0% N. The average molecular weight is 590.

*Example 11*

400 parts by weight of dicyclohexylcarbodiimide and 125 parts by weight of diisocyanatochlorobenzene (2,4- and 2,6-isomer mixture) are mixed. Carbon dioxide is evolved and this is accelerated by applying a vacuum. After the mixture has become stable, (which is the case after extraction of gas for about 3 hours at 90° C.), unreacted dicyclohexylcarbodiimide together with a little cyclohexylisocyanate is distilled off at a sump temperature of 120° C. and a pressure of 0.3 mm. Hg. There are obtained 190 parts by weight of distillate and 280 parts by weight of a light-coloured resin with the following composition: 68.9% C, 7.5% H, 0.7% O, 15.0% N and 8.0% Cl. The average molecular weight is 720.

*Example 12*

From a mixture consisting of 3500 parts by weight of toluylene diisocyanate (2,4- and 2,6-isomer mixtures in the ratio 65:35) and 600 parts by weight of freshly distilled diphenyl carbodiimide, 1100 parts by weight of isocyanate mixture, of which 700 parts by weight are phenylisocyanate, are distilled off within 2 hours in a vacuum slowly increasing from 80 to 2 mm. Hg and with a sump temperature rising from 140 to 165° C. 3000 parts by weight of a polyisocyanate mixture containing mono- and poly-carbodiimides remain. After this light yellow oil has been cooled to room temperature, 37.4% of NCO groups are found (equivalent weight 42). If a sample is heated for a short time to 160 to 180° C. before determining the NCO content, then 38.7% NCO are found.

*Example 13*

2980 parts by weight of 4,4'-diisocyanatodiphenylmethane are melted and reacted with 120 parts by weight of diphenylcarbodiimide, as described in the preceding example. During this operation, the sump temperature is allowed to rise within 2 hours from 135 to 188° C. while gradually increasing the vacuum from 60 to 1 mm. Hg. The distillate, of which there are 210 parts by weight, consists of 56% of phenylisocyanate. 2845 parts by weight of an oil are formed, from which 120 parts by weight of uretedione crystallise out on cooling.

The oil separated from the uretedione solidifies at approximately −5° C. In the cold state, it contains 30.7% of free NCO and, calculated from the result of the titration of a specimen briefly heated to 180° C., 1.1% of concealed NCO with the equivalent weight 42.

*Example 14*

From 3000 parts by weight of naphthylene-1,5-diisocyanate and 150 parts by weight of dicyclohexylcarbodiimide, and using the procedure described in Example 12, there are obtained 120 parts by weight of distillate with a cyclohexylisocyanate content of 83% and 3000 parts by weight of a polyisocyanate solidifying at 124° C. and containing carbodiimide groups. The content of free NCO groups is 37.5% and the content of concealed NCO groups is 0.5%.

What is claimed is:

1. The process for the manufacture of polycarbodiimides which comprises reacting a polyisocyanate of the formula $R_1(NCO)_x$ with a monocarbodiimide of the formula $R_2-NCN-R_2$, selectively removing the monoisocyanate $R_2-NCO$ formed in the reaction from the reaction mixture and continuing said reaction and said isocyanate removal until the desired polycarbodiimide forms as a residue, $R_1$ representing a member selected from the group consisting of substituted and unsubstituted aliphatic, aromatic, cycloaliphatic and heterocyclic moieties, the substituents of each such substituted moiety being selected from the group consisting of chloro, nitro and alkoxy, said moieties having a valence equal to $x$ as defined hereinafter, $R_2$ representing a monovalent member selected from the group consisting of substituted and unsubstituted aliphatic, aromatic, cycloaliphatic and heterocyclic moieties, the substituents of each such substituted moiety being selected from the group consisting of chloro, nitro and alkoxy and $x$ representing an integer of at least 2.

2. The process of claim 1 wherein said reaction is carried out at a temperature between 80 and 230° C.

3. The process of claim 1 wherein hexamethylene diisocyanate and dicyclohexylcarbodiimide are employed as reactants and cyclohexylisocyanate is selectively removed from the reaction mixture.

4. The process of claim 1 wherein toluylene-2,4-diisocyanate and dicyclohexylcarbodiimide are employed as reactants and cyclohexylisocyanate is selectively removed from the reaction mixture.

5. The process of claim 1 wherein 4,4'-diisocyanato diphenyl methane and dicyclohexylcarbodiimide are employed as reactants and cyclohexylisocyanate is selectively removed from the reaction mixture.

6. The process of claim 1 wherein toluylene-2,4-diisocyanate and diphenylcarbodiimide are employed as reactants and phenylisocyanate is selectively removed from the reaction mixture.

7. The process of claim 1 wherein 4,4'-diisocyanato diphenyl methane and diphenylcarbodiimide are employed as reactants and phenylisocyanate is selectively removed from the reaction mixture.

References Cited by the Examiner

UNITED STATES PATENTS

| | | | |
|---|---|---|---|
| 2,853,473 | 9/1958 | Campbell | 260—77 |
| 3,152,162 | 10/1964 | Fischer et al. | 260—551 XR |

FOREIGN PATENTS 1,012,601  7/1957  Germany.

OTHER REFERENCES

Degering et al.: Outline of Organic Nitrogen Compounds (1945), 1682–89 and 1752–60, University Lithoprinters, Ypsilanti, Mich.

WALTER A. MODANCE, *Primary Examiner.*

JOHN D. RANDOLPH, HAROLD BERNSTEIN,
*Examiners.*

HARRY I. MOATZ, MARK C. JACOBS,
*Assistant Examiners.*